United States Patent [19]
Seifert

[11] 3,852,888
[45] Dec. 10, 1974

[54] ROLL LEVEL CHECKING DEVICE
[75] Inventor: Gerald R. Seifert, Munster, Ind.
[73] Assignee: Inland Steel Company, Chicago, Ill.
[22] Filed: July 20, 1972
[21] Appl. No.: 273,501

[52] U.S. Cl. ................................. 33/286, 33/227
[51] Int. Cl. ......................... G01b 5/24, G01c 1/00
[58] Field of Search ............ 33/263, 286, 227, 228, 33/376, 275 R

[56] References Cited
UNITED STATES PATENTS

| | | | |
|---|---|---|---|
| 527,815 | 10/1894 | Schnell | 33/376 UX |
| 685,455 | 10/1901 | Kinkead | 33/286 |
| 958,736 | 5/1910 | Ferris | 33/286 |
| 1,847,811 | 3/1932 | Buccicone | 72/6 |
| 2,198,837 | 4/1940 | Morgan | 33/228 |
| 2,368,377 | 1/1945 | Phillips | 72/35 |
| 3,534,571 | 10/1970 | Sivilotti et al. | 72/8 |

Primary Examiner—Louis R. Prince
Assistant Examiner—Richard R. Stearns
Attorney, Agent, or Firm—Merriam, Marshall, Shapiro & Klose

[57] ABSTRACT

A device for simultaneously sensing more than one point on a surface whose slope is to be measured, using a conventional sighting device, whereby the operator can obtain, in one reading, the relative grade differential of the points sensed and consequently can determine the slope of the surface to be measured. In application to the measuring of the top surface slope of a slab of metal which has passed through a blooming or slabbing mill, the device permits the operator to check the parallelism of the horizontal mill rolls by measuring the slope (or lack of parallelism) of the rolled slab, replacing direct measurement with a line of sight measurement.

7 Claims, 6 Drawing Figures

ROLL LEVEL CHECKING DEVICE

BACKGROUND OF THE INVENTION

This invention relates generally to slope measuring devices and particularly to a device for measuring the surface slope of an object such as a rolled slab of metal as a means for checking whether the mill rolls are properly in parallel and, if not, to determine the degree to which they are out of parallel.

A common problem in metal rolling operations, especially those dealing with relatively thick slabs (on the order of 10 inches) is wedge-shaped slabs, i.e., slabs whose upper and lower surfaces are out of parallel after passing through a rolling mill such as a blooming or slabbing mill. When a wedge-shaped slab subsequently is sent through the roughing train of a hot rolling mill, the thicker side undergoes a greater percentage reduction and comes out longer than does the thinner side. A relatively small top surface slope on a slab emerging from a blooming or slabbing mill can significantly interfere with subsequent operations. For example, if one side of a 30-foot long, 10-inch thick (nominal) slab is one-fourth inch thicker than the other, and the total reduction in the roughing train is 90 percent, the thicker side will come out $0.25/10 \times 10 \times 30 = 7.5$ feet longer than the thinner side. This difference in length would create a curvature or camber in the slab.

Excessive camber in a slab can cause it to hit stand entry guides or even to leave the mill table. Even if a wedge-shaped slab is successfully fed all the way through a hot strip mill without jamming, it can still present problems for an automatic gauge control system and create problems with strip shape and flatness.

Rolling mill operators sometimes attempt to compensate for camber by adjusting the screws which control the attitude of the horizontal rolls of the mills. That is, the mill rolls are intentionally set out of parallel with the proper tilt to induce a compensating camber as the cambered slab passes through the particular mill rolls. It is not rare to find the roughing train of a hot strip rolling mill with the roll adjusting screws staggered in an attempt to compensate for camber, first in one direction and then the other. It is difficult to compensate for camber by adjusting the mill roll screws, however, because of thickness changes from job order to job order. Even when the hot mill is rolling a series of slabs which are of the same job order and which went through the slabbing mill in series, it is difficult to allow for camber by adjusting the screws of the roughing mill rolls because the thicker edge can be on either side of the table. This is because during slab conditioning operations some slabs are turned over once, some twice, and others not at all.

It is preferable to eliminate the problems caused by wedge-shaped slabs by preventing their formation. The principal cause of wedge-shaped slabs is that the rolls of the working mill, such as a blooming or slabbing mill are out of parallel. There are various factors which can cause the mill rolls to get out of parallel. One is uneven wear of the brass pressure plates between the bottoms of the roll adjustment screws and the top of the top work roll chucks. Wear on these pressure plates can be on the order of one-fourth inch per week and uneven wear can be caused by slight differences in lubricant flow. Another factor is that the work roll may be slightly tapered. Another is that the drive spindle on the bottom roll may be improperly balanced so that there is a tendency for the end of the unloaded bottom roll opposite the drive side to lift. Following ordinary procedures, the top roll is then set parallel to the out-of-level bottom roll and, when the rolling load is applied, the unbalanced bottom roll is forced back down, thus causing the rolls to be forced out of parallel. Another factor is human error in calipering the mill roll spacing to check parallelism or in converting the caliper reading to differential adjusting screw movement.

Automatic screw adjustment devices based on the use of load cells to detect pressure differential across the mill rolls and thus departure from parallelism has been used in mills which perform operations on relatively thin work pieces. This type of device has not been considered suitable for operations on thick slabs, however, one reason being that it is necessary to use fast screws on these mill rolls to permit rapid accommodation of relatively large changes in mill roll settings and to open the mills quickly. These fast screws require high speed, low torque screw adjusting motors which are susceptible to overloading if the mill rolls are brought into a position where they touch, thereby forcing a set on the screws which is too tight for the motor to back off and overcome. It is difficult and time consuming to restore a mill thus frozen to service.

Heretofore, the manner of checking the parallelism of the horizontal rolls of a mill such as a blooming or slabbing mill has been as follows: After every roll change and about 2 to 3 times per shift, the mill would be shut down and locked out of operation. A worker would then measure the distance between the mill rolls at an open setting of, say, 5 inches with a set of inside calipers, being careful to keep the calipers in a vertical plane perpendicular to the roll axis and in the vertical plane of the roll centerline. Readings would be taken at each end of the rolls. The differential in caliper readings would then be converted into the proper differential movement of the adjusting screws of the rolls to bring them back into parallel. This procedure was cumbersome, time-consuming, and prone to human error. For example, it was very easy to cock the calipers or to get them out of the proper measuring plane and error could be made in mathematically converting the caliper readings into required screw movement. In addition, since the measurements had to be made when the mill was in an open, no-load condition, the method of measuring could not detect lack of parallelism occurring only under loaded conditions such as occurs with an improperly balanced drive spindle, described previously.

Another means of checking mill roll parallelism heretofore tried has been to caliper the slab itself. Among the drawbacks to this method is that it is difficult to caliper a hot slab; as with calipering the mill rolls, the method is time-consuming and subject to human error; and further, if the slab is slightly "dog-boned" or has burred edges, the calipers cannot be removed without opening them, thereby losing the reading.

SUMMARY OF THE INVENTION

The slope-measuring device of this invention overcomes the drawbacks of the prior art devices used to check the parallelism of the horizontal rolls of mills such as blooming or slabbing mills, and it has a general applicability to situations where it is desirable to measure the slope of an object.

The device of this invention checks the parallelism of the horizontal mill rolls by measuring the slope (or lack of parallelism) or a slab after it has passed through the mill. The slab's surface slope will reflect the degree to which the rolls are out of parallel. This device further replaces direct measurements, such as with a caliper, by line of sight measurements.

Briefly, the device of this invention provides for simultaneously sensing more than one point on the top of a rolled slab, the points being on the same transverse line across the mill table. A conventional surveyor's level can be used. The scale reading resulting from this simultaneous sensing of two points enables the operator to obtain, in one reading, the relative grade differential of the two points and consequently the slope of the slab top surface. The scale can be so calibrated as to read directly in units of differential screw movement required to level the rolls, if desired.

This device, described in detail below, has the following advantages: It is not necessary to shut down the blooming or slabbing mill to take the parallelism measurement; it provides a quick, safe means for taking the parallelism measurements; the worker does not have to get close to a hot slab, nor does he have to climb onto the mill table or reach into the mill; the opportunity for human error in measurement and calculation are reduced; the device checks the parallelism of a loaded mill, which is where the parallelism counts; it is not necessary for the work rolls to be level in the mill because parallelism is the function required, nor is it necessary that the mill housing be plumb; the mill table, which is where the measuring takes place, does not have to be level; and it does not matter if the slab is turned up or down. The slab to be measured should have no transverse bow, however, nor should it be tilted off of the plane of the top of the table roll where slope measurement is taken.

DETAILED DESCRIPTION OF A PREFERRED EMBODIMENT

Figure 1:
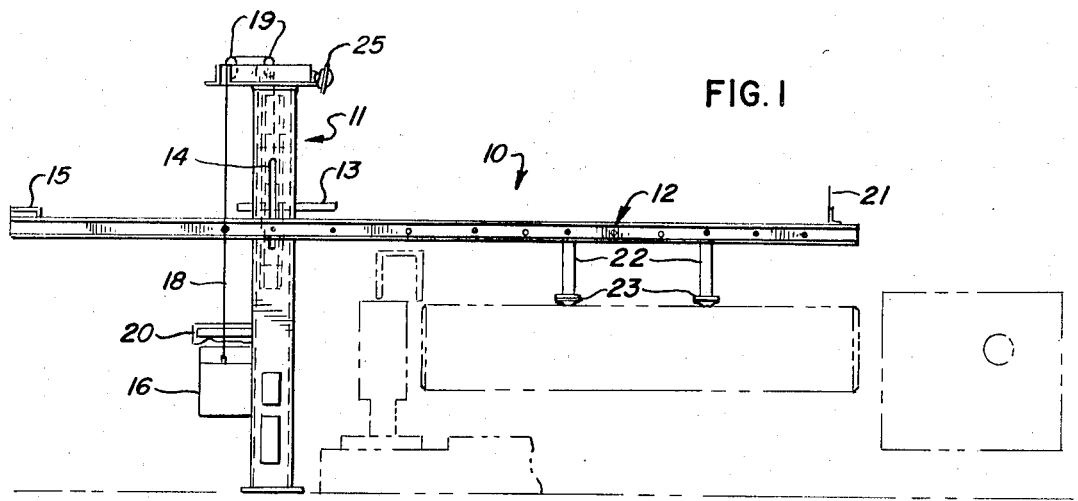
FIG. 1 is an elevation view of an embodiment of the slope measuring device of this invention in its first or base position.
Figure 2:
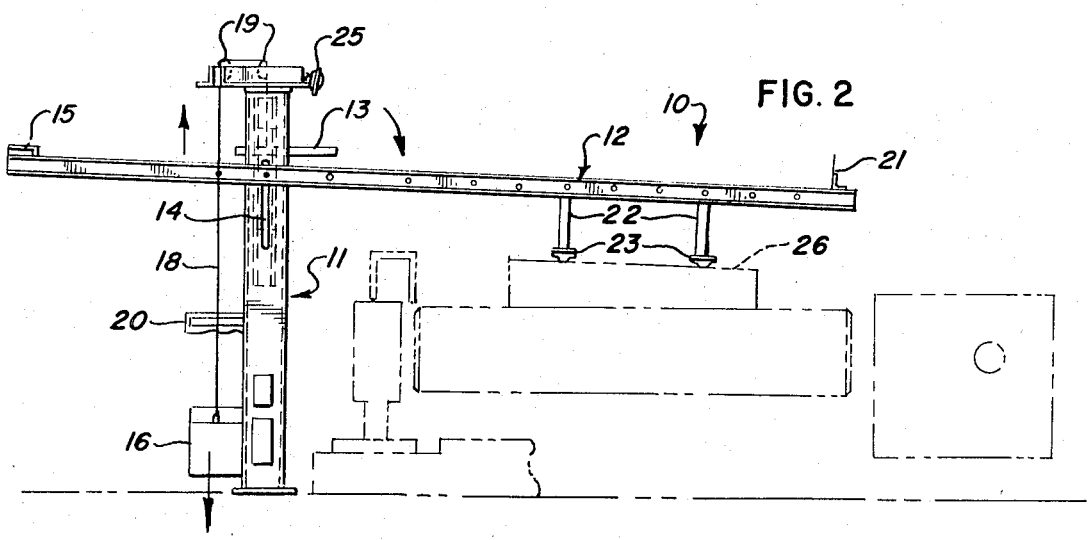
FIG. 2 is an elevation view of an embodiment of the slope measuring device of the invention in its second of slope measuring position.
Figure 3:
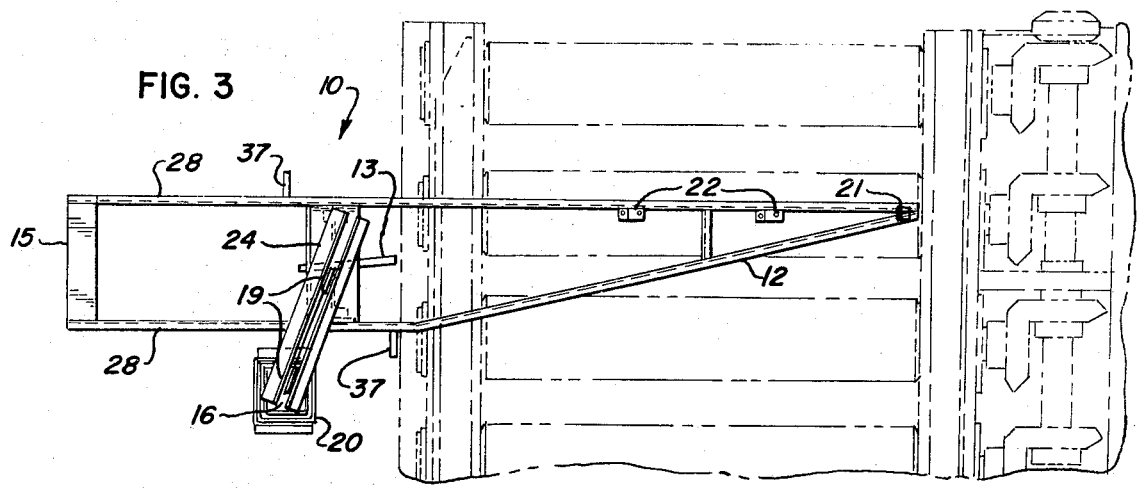
FIG. 3 is a plan view of an embodiment of the slope measuring device of this invention.

Referring to FIGS. 1–3, an embodiment of the slope measuring device of this invention is indicated generally at 10. Assembly 10 consists basically of a vertical frame or sight mounting 11, a transversely extending frame 12, and a conventional surveyor's level such as a dumpy level 13.

Frame 11 is secured in a vertical position adjacent the mill table (shown in phantom in FIGS. 1–3). Frame 12 is pivotally attached to vertical frame 11 as shown in more detail in FIG. 4 and extends transversely therefrom, overhanging the mill table. Frame 12 is also vertically moveable within vertical frame 11, along the length of slot 14, as shown in more detail in FIGS. 4–5. Frame 12 is counterweighted to assist in manual pivotal movement by a weight 15. Frame 12 is counterweighted to assist in manual vertical movement by a weight 16 attached to a sight housing 17 (shown in detail in FIG. 4) by a cable 18 which passes over pulleys 19 attached to a standard 24. Weight 16 moves up and down within protective housing 20 which is designed to prevent the weight from dropping on the operator if cable 18 should break. Frame 12 has a scale 21 attached near its distal end and two contact member 22 attached to and extending downwardly therefrom. Contact members 22 have feet portions 23 preferably made of a heat-resistant material such as stellite.

Figure 4:
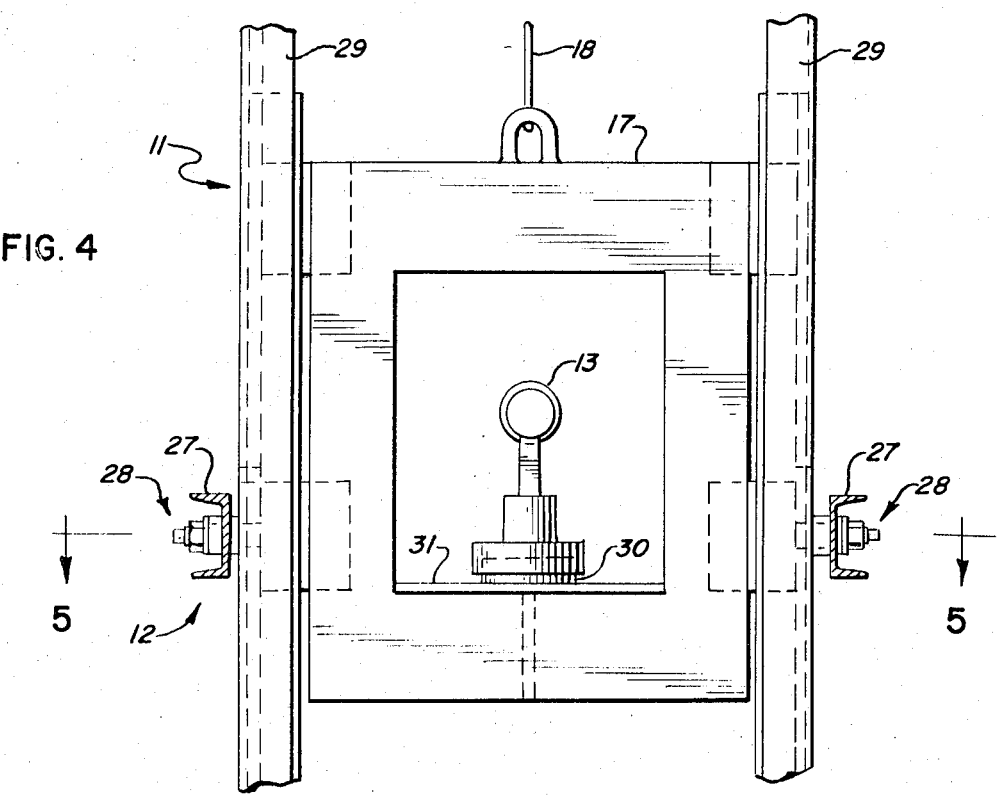
FIG. 4 is an elevation view of the sight housing of an embodiment of the slope measuring device of this invention.
Figure 5:
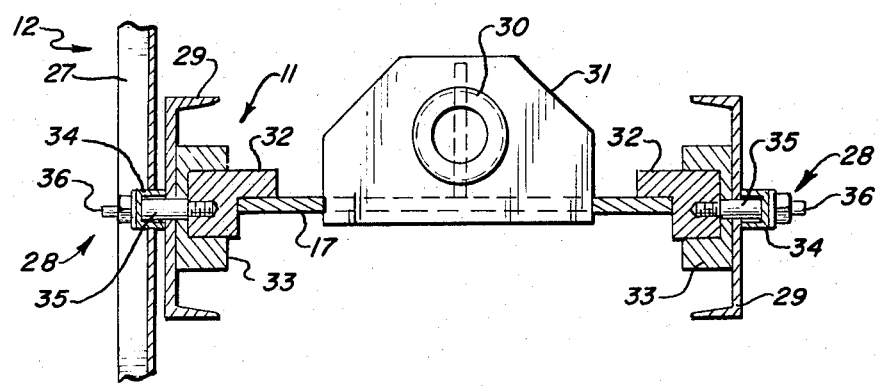
FIG. 5 is a sectional view taken along line 5—5 of FIG. 4.

A conventional surveyor's level 13 is attached to vertical frame 11 by means of sight housing 17, as shown in more detail in FIGS. 4 and 5. Level 13 and its housing 17 are vertically moveable, together with frame 12, along the length of slot 14.

Figure 6:
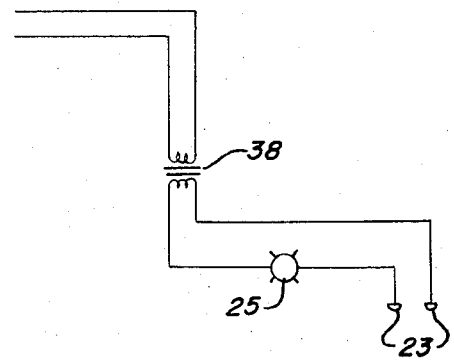
FIG. 6 is a schematic drawing of the electrical circuit of an embodiment of the slope measuring device of this invention.

As shown in FIGS. 2 and 6, a light 25 may be attached to frame 11 and directed so as to illuminate scale 21. In such case, contact feet 23 are electrically connected to light 25 so as to close the circuit when both feet make contact with the electrically conducting slab 26. A suitable conventional single phase step-down (100/12 volt) transformer 38 may be inserted in the circuit to reduce the line voltage to 12 volts, suitable for operating a 12-volt auto sealed beam spotlight. The electrical wiring needed to connect contact feet 23 to light 25 should preferably be a high temperature, number 12 wire, encased in silicone rubber with asbestos braid.

Referring to FIGS. 4 and 5, sight housing 17 and the manner of joining housing 17 and frame 12 to frame 11 are shown in more detail. Channels 27 form the side pieces of frame 12 shown in FIGS. 1–3. By means of trunnion assemblies 28, channels 27 and thus frame 12 are mounted on vertical frame member 11 so as to be vertically slideable within slot 14 shown in FIGS. 1 and 2. Trunnion assemblies 28 also mount sight housing 17 to vertical frame 11 and frame 12 for vertical movement with frame 12 within slot 14.

It will be seen from FIGS. 4 and 5 that upper and lower sliding blocks 32 are moveable vertically within vertical ways 33 which are welded to channels 29 of vertical frame 11 and, held by trunnion assemblies 28, sight housing 17 is rigidly fixed with respect to frame 12 for vertical movement therewith. Preferably blocks 32 and vertical ways 33 are made of bronze.

Again referring to FIG. 5, while sight housing 17 is vertically moveable with frame 12, channels 27 and accordingly frame 12 are pivotally mounted to frame 11 for independent rotational movement about the pivot point or trunnion formed by trunnion bolt assemblies 28 one of which is threaded into each of the lower two of the blocks 32. Spacers 34 separate channels 27 of frame 12 from channels 29 of frame 11 and serve as guides for the movement of sight housing 17 within slots 14. The unthreaded portions 35 of bolts 36 positioned within spacers 34 permit rotation of frame 12 within respect to frame 11 while bolts 36 rigidly support sight housing 17 with respect to frame 11.

Conventional surveyor's level 13 is mounted on housing 17 by screwing it onto mounting ring 30 welded to mounting plate 31. Level 13 has a conventional leveling plate with conventional screws for adjusting the cross-hair of the sight.

In operation, the operator stations himself between channels 27 of frame 12. He then grasps handles 37 (FIG. 3) and moves frame 12 downward to the position shown in FIG. 1. When not in use, frame 12 is in a position at the top of slot 14 and tilted so that the scale end of frame 12 is up and away from the mill table. The operator then rotates frame 12 until feet (feelers) 23 make contact with the top of mill roll, adjusting frame 12 vertically as needed. (Frame 11 is so situated adjacent the mill table that frame 12 extends over the longitudinal centerline of a mill table roll). When contact with the mill table roll has been made, the operator adjusts level 13 until its cross-hair reads zero on scale 21. He then locks the level in that attitude and thus completes the calibration procedure.

FIG. 2 depicts the operating position of the slope-measuring device for determining the slope of a slab which has passed through a mill such as a blooming or slabbing mill. The operator positions slab 26 adjacent vertical frame 11. He then adjusts frame 12 vertically and rotationally until feet 23 make contact with slab 26. The operator then reads the cross-hair of level 13 on scale 21. It is to be noted that level 13 moves vertically with frame 12 but does not rotate with it. Level 13 thus maintains the attitude which was set during the calibration procedure described above.

Scale 21 can be calibrated so as to read directly in terms of the required relative adjusting screw movement, up or down, on the blooming or slabbing mill rolls to bring the mill rolls into parallel (to bring the slope of a rolled slab back to zero). This calibration is possible by use of simple trigonometry. Since the fixed distance between the level 13 and scale 21 is known, and the differential distance between the zero reading and operating reading on scale 21 is known, the angle $\phi$ between the generally horizontal reference plane of the mill table roll and the top surface slope of the slab 26 is determined as $\phi = \tan^{-1} \Delta/M$ where $\Delta$ is the differential scale reading and $M$ is the fixed distance between the level 13 and scale 21. The calibration is thus a function of the known distance between adjusting screws on the blooming or slabbing mill in ratio to the fixed distance between level 13 and scale 21.

If desired, light 25 may be electrically connected to feet 23 as described so as both to provide a source of illumination of scale 21 and to serve as an indication to the operator that contact with both feet 23 has been made on slab 26. Also, if desired, light 25 could be replaced with a conventional audio device such as an electrically operated horn to serve as an indicator that contact with both feet 23 on slab 26 has been made.

Also, if desired, the slope measuring device of this invention can be provided with a hinged heat shield to fit over surveyor's level 13 to protect it against heat when the device is not in use and with a foot switch enabling the operator to take the mill table out of operation temporarily while making his readings.

While a preferred embodiment of the slope-measuring device of this invention has been described with reference to the measurement of the top surface slope of a rolled slab of metal, it will be apparent that its applicability extends generally to other objects whose slopes are desired to be measured.

What is claimed is:

1. A slope measuring device comprising:
   sighting means;
   means for mounting said sighting means adjacent an object whose slope is to be measured;
   slope sensing means associated with said sighting means comprising a scale and at least two spaced slope contact points for defining the line whose slope is to be measured;
   means connecting said spaced contact points and said scale in predetermined spaced relation with respect to each other and to an axis which is orthagonal to the line of sight of said sighting means and fixed with respect thereto;
   means for moving said slope sensing means to a reference position in which the spaced slope contact points are parallel to a reference plane to obtain a first sight reading on said scale means; and
   means for moving said slope sensing means vertically together with said sighting means transverse to the line of sight of said sighting means and pivotally independent of said sighting means about the said axis which is orthagonal to said sighting means and fixed with respect thereto, to a second position in which the spaced slope contact points are parallel to the slope of said object to be measured to obtain a second sight reading on said scale, whereby the differential between said first and second sight readings is a measure of the slope of said object.

2. The slope measuring device described in claim 1, wherein said means connecting said spaced slope contact points and scale is pivotally connected to said means for mounting said sighting means.

3. The slope measuring device described in claim 2, wherein the spaced slope contact points of said slope sensing means comprise at least two extended spaced slope contact feelers for contacting said object to be measured.

4. The slope measuring device described in claim 3, and comprising:
   electrically responsive means electrically connected to said contact members; and
   means responsive to engagement of said contact members with an electrically conducting object whose slope is to be measured for energizing said electrically responsive means.

5. The slope measuring device described in claim 4, wherein:
   said electrically responsive means comprises light generating means;
   said measuring device comprising means mounting said light generating means for directing light onto said scale when said light generating means is energized.

6. A device for checking parallelism of mill rolls by measuring the slope of the surface of a slab of material after it has been passed through said mill rolls, said device comprising:
   an adjustable sighting means;
   means for mounting said sighting means adjacent a mill table;
   a frame member extendable over said mill table and having at least a pair of spaced feelers extending therefrom for contacting the surface of said slab on said mill table to define the slope of said slab;

a scale mounted on said frame member;

means pivotally connecting said frame member to said means for mounting said sighting means for pivotal movement about an axis which is orthagonal to the line of sight of said sighting means and fixed with respect thereto, said feelers and scale being mounted on said frame in predetermined spaced relation to each other;

means for guiding said sighting means and said frame member for vertical translatory motion transverse to the line of sight of said sighting means, whereby said sighting means and said frame member can be adjusted to obtain a reference reading while said frame member is at a first position in which the end points of said spaced feelers define a line corresponding to a parallel position of said mill rolls, and thereafter asid frame and spaced feelers can be pivotally moved independently of said sighting means and vertically moved together with said sighting means to a second position to define a line parallel to the slope of said slab to permit a second reading on said scale, the calibrated differential between said first and second scale readings provided the data needed to adjust the mill roll screws to bring said mill rolls into parallel.

7. The device described in claim 6, wherein:

said sighting means is a surveyor's level with crosshair.

* * * * *